(12) United States Patent
Guo et al.

(10) Patent No.: US 10,888,824 B2
(45) Date of Patent: Jan. 12, 2021

(54) METHODS FOR TREATING FILLED MICROPOROUS MEMBRANES

(71) Applicant: PPG Industries Ohio, Inc., Cleveland, OH (US)

(72) Inventors: Qunhui Guo, Murrysville, PA (US); James C. Peters, Pittsburgh, PA (US); Luciano M. Parrinello, Allison Park, PA (US); Linda K. Anderson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 8 days.

(21) Appl. No.: 15/352,984

(22) Filed: Nov. 16, 2016

(65) Prior Publication Data
US 2018/0133664 A1    May 17, 2018

(51) Int. Cl.
| | |
|---|---|
| *B01D 71/82* | (2006.01) |
| *B01D 61/14* | (2006.01) |
| *B01D 67/00* | (2006.01) |
| *B01D 69/14* | (2006.01) |
| *B01D 71/02* | (2006.01) |
| *B01D 71/26* | (2006.01) |
| *B01D 69/02* | (2006.01) |
| *B01D 65/08* | (2006.01) |
| *C02F 1/44* | (2006.01) |

(52) U.S. Cl.
CPC ........... *B01D 71/82* (2013.01); *B01D 61/147* (2013.01); *B01D 65/08* (2013.01); *B01D 67/0093* (2013.01); *B01D 69/02* (2013.01); *B01D 69/148* (2013.01); *B01D 71/027* (2013.01); *B01D 71/26* (2013.01); *C02F 1/444* (2013.01); *B01D 2325/16* (2013.01); *B01D 2325/36* (2013.01)

(58) Field of Classification Search
CPC .. B01D 61/147; B01D 65/08; B01D 67/0093; B01D 69/02; B01D 69/141; B01D 69/148; B01D 71/027; B01D 71/26; B01D 71/82; B01D 2325/16; B01D 2325/36; B01J 20/265; C02F 1/444
See application file for complete search history.

(56) References Cited

U.S. PATENT DOCUMENTS

| | | | |
|---|---|---|---|
| 2,940,830 A | 6/1960 | Thornhill | |
| 4,681,750 A | 7/1987 | Johnson et al. | |
| 5,196,262 A | 3/1993 | Schwarz et al. | |
| 2005/0087491 A1* | 4/2005 | Hennige | B01D 53/228 210/640 |
| 2009/0090241 A1 | 4/2009 | Julbe et al. | |
| 2010/0230351 A1* | 9/2010 | Hoving | B01D 69/02 210/650 |
| 2012/0251890 A1* | 10/2012 | Pascaly | B01D 67/0046 429/251 |
| 2013/0228529 A1 | 9/2013 | Guo et al. | |
| 2014/0069862 A1 | 3/2014 | Guo et al. | |
| 2014/0150647 A1* | 6/2014 | Ahn | B01D 67/0079 95/51 |

FOREIGN PATENT DOCUMENTS

RU    2418622 C2    5/2011

OTHER PUBLICATIONS

Martin, Effect of amine functionalization of SBA-15 used as filler on the morphology and permeation properties of polyethersulfone-doped ultrafiltration membranes, Journal of Membrane Science, 2016, pp. 8-18, vol. 520.
"Aramid", Britannica Online Encyclopedia, https://www.britannica.com/science/aramid, 2009, pp. 1-2.
Campbell, "Chapter 2—Fibers and Reinforcements: The String That Provides the Strength", 2.3 Aramid Fibers, Manufacturing Processes for Advanced Composites, 2004, pp. 44-45.

\* cited by examiner

*Primary Examiner* — Patrick Orme
(74) *Attorney, Agent, or Firm* — The Webb Law Firm (57) ABSTRACT

The present invention is directed to a method for treating a surface of a filled microporous membrane. The microporous membrane includes a polyolefinic matrix, inorganic filler distributed throughout the matrix, and a network of interconnecting pores throughout the membrane. The method includes sequentially (1) contacting at least one surface of the membrane with a treatment composition of a silane-functional polyamine compound having at least one alkoxy silane group, such that the silane-functional polyamine compound is in intimate contact with the filler present in the matrix; and (2) subjecting the membrane of (1) to conditions sufficient to effect a condensation reaction between the inorganic filler and the silane-functional polyamine compound. Treated membranes also are provided.

17 Claims, 1 Drawing Sheet ns using $c_i$...

METHODS FOR TREATING FILLED MICROPOROUS MEMBRANES

FIELD OF THE INVENTION

The present invention relates to methods for treating microporous membranes useful as filtration and adsorption media, and to microporous membranes prepared by the methods.

BACKGROUND OF THE INVENTION

According to the Department of Energy, 21 billion gallons of co-produced water are drawn up by oil and gas wells each year in the United States. Natural "oil" from a well is actually a multiphase fluid of oil/water/gas. Generally, all three fluids are found in every hydrocarbon well and well effluent.

Because of its value and because of environmental concerns, oil needs to be separated from this effluent. This is usually done through gravitational settling in large tanks, which requires capital and significant space that is not always available onsite. Gas is separated easily in a mechanical separator or by pressure reduction within storage containers. In the case of heavy oils and many emulsified fluid systems, the raw fluids are heated to change the density of the oil and water by heating off lighter ends and essentially agitating their molecular structures so that these fluids can more easily separate. Water then is a byproduct.

Filled microporous membranes are known to be low cost, efficient, and environmentally friendly separation media for the separation of oil from byproduct water as mentioned above. Notwithstanding, as with most filtration media, over a period of time the filtration membranes can become fouled with residual oil and other contaminants. Such fouling can decrease the flux rates and, thus, reduce the efficiency of the filter devices. Hence, it would be desirable to provide a microporous membrane for use as an extended life filtration medium having improved anti-fouling properties while maintaining a high flux rate. The methods for treating filled microporous membranes as disclosed and claimed herein provide such improved anti-fouling properties.

SUMMARY OF THE INVENTION

The present invention is directed to a method for treating a surface of a filled microporous membrane. The microporous membrane comprises a polyolefinic polymeric matrix, finely divided, particulate, substantially water-insoluble inorganic filler distributed throughout the matrix, and a network of interconnecting pores communicating throughout the microporous membrane. The method comprises in sequence (1) contacting at least one surface of the membrane with a treatment composition comprising a silane-functional polyamine compound having at least one alkoxy silane group, the silane-functional polyamine compound being in intimate contact with the filler present in the matrix; and (2) subjecting the membrane of (1) to conditions sufficient to effect a condensation reaction between the inorganic filler and the silane-functional polyamine compound.

The present invention also is directed to treated microporous membranes prepared by the various claimed methods.

DETAILED DESCRIPTION OF THE INVENTION

Other than in any operating examples, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents unless expressly and unequivocally limited to one referent.

The various embodiments and examples of the present invention as presented herein are each understood to be non-limiting with respect to the scope of the invention.

The present invention is directed to a method for treating a surface of a filled microporous membrane. The microporous membrane comprises a polyolefinic polymeric matrix, finely divided, particulate, substantially water-insoluble inorganic filler distributed throughout the matrix, and a network of interconnecting pores communicating throughout the microporous membrane. The method comprises sequentially (1) contacting at least one surface of the membrane with a treatment composition comprising a silane-functional polyamine compound having at least one alkoxy silane group, the silane-functional polyamine compound being in intimate contact with the filler present in the matrix; and (2) subjecting the membrane of (1) to conditions sufficient to effect a condensation reaction between the inorganic filler and the silane-functional polyamine compound.

As used herein, "microporous material" or "microporous membrane" or "microporous sheet" means a material having a network of interconnecting pores, wherein, on a treatment-free, coating-free, printing ink-free, impregnant-free, and pre-bonding basis, the pores have a volume average diameter ranging from 0.001 to 1.0 micrometer, and constitute at least 5 percent by volume of the microporous material as discussed herein below.

The polyolefinic polymeric matrix can comprise any of a number of known polyolefinic materials known in the art. In some instances, a different polymer derived from at least one ethylenically unsaturated monomer may be used in combination with the polyolefinic polymers. Suitable examples of such polyolefinic polymers can include, but are not limited to, polymers derived from ethylene, propylene, and/or butene, such as polyethylene, polypropylene, and polybutene. High density and/or ultrahigh molecular weight polyolefins, such as high density polyethylene, are also suitable. The polyolefin matrix also can comprise a copolymer, for example, a copolymer of ethylene and butene or a copolymer of ethylene and propylene.

Non-limiting examples of ultrahigh molecular weight (UHMW) polyolefin can include essentially linear UHMW polyethylene (PE) or polypropylene (PP). Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often, the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 39 deciliters/gram, e.g., from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

For purposes of the present invention, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M = 5.37 \times 10^4 [\eta]^{1.37}$$

wherein M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\eta]^{1.25}$$

wherein M is the nominal molecular weight and $[\eta]$ is the intrinsic viscosity of the UHMW polypropylene expressed in deciliters/gram.

A mixture of substantially linear ultrahigh molecular weight polyethylene and lower molecular weight polyethylene can be used. In certain embodiments, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UHMW polyethylene used is described in relation to FIG. 6 of U.S. Pat. No. 5,196,262; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities are found in the following table.

| Type | Abbreviation | Density, g/cm³ |
| --- | --- | --- |
| Low Density PE | LDPE | 0.910-0.925 |
| Medium Density PE | MDPE | 0.926-0.940 |
| High Density PE | HDPE | 0.941-0.965 |

Any or all of the polyethylenes listed in the table above may be used as the LMWPE in the matrix of the microporous material. HDPE may be used because it can be more linear than MDPE or LDPE. Processes for making the various LMWPE's are well known and well documented. They include the high-pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often, the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes, such as at least 1.0 gram/10 minutes.

The UHMWPE and the LMWPE may together constitute at least 65 percent by weight, e.g., at least 85 percent by weight, of the polyolefin polymer of the microporous material. Also, the UHMWPE and LMWPE together may constitute substantially 100 percent by weight of the polyolefin polymer of the microporous material.

Typically, the polyolefinic polymeric matrix can comprise a polyolefin comprising ultrahigh molecular weight polyethylene, ultrahigh molecular weight polypropylene, high density polyethylene, high density polypropylene, or mixtures thereof.

If desired, other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers can be neutralized with sodium, zinc, or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

The microporous membranes of the present invention further comprise finely divided, particulate, substantially water-insoluble inorganic filler distributed throughout the matrix.

The inorganic filler can include any of a number of inorganic fillers known in the art, provided that the filler is capable of undergoing a condensation reaction with silane present in the treatment composition comprising a silane-functional polyamine compound which is applied to the membrane in (1). The filler should be finely divided and substantially water insoluble to permit uniform distribution throughout the polyolefinic polymeric matrix during manufacture of the microporous material. Generally, the inorganic filler is selected from the group consisting of silica, alumina, calcium oxide, zinc oxide, magnesium oxide, titanium oxide, zirconium oxide, and mixtures thereof.

The finely divided substantially water-insoluble filler may be in the form of ultimate particles, aggregates of ultimate particles, or a combination of both. At least about 90 percent by weight of the filler used in preparing the microporous material has gross particle sizes in the range of from 5 to about 40 micrometers, as determined by the use of a laser diffraction particle size instrument, LS230 from Beckman Coulton, capable of measuring particle diameters as small as 0.04 micron. Typically, at least 90 percent by weight of the filler has gross particle sizes in the range of from 10 to 30 micrometers. The sizes of the filler agglomerates may be reduced during processing of the ingredients used to prepare the microporous material. Accordingly, the distribution of gross particle sizes in the microporous material may be smaller than in the raw filler itself.

As mentioned previously, the filler particles are substantially water-insoluble, and also can be substantially insoluble in any organic processing liquid used to prepare the microporous material. This can facilitate retention of the filler in the microporous material.

In addition to the fillers, other finely divided particulate substantially water-insoluble materials optionally may also be employed. Non-limiting examples of such optional materials can include carbon black, charcoal, graphite, iron oxide, copper oxide, antimony oxide, molybdenum disulfide, zinc sulfide, barium sulfate, strontium sulfate, calcium carbonate, and magnesium carbonate. In one non-limiting embodiment, silica and any of the aforementioned optional filler materials can comprise the filler.

The filler typically has a high surface area allowing the filler to carry much of the processing plasticizer used to form the microporous material. High surface area fillers are materials of very small particle size, materials that have a high degree of porosity, or materials that exhibit both characteristics. The surface area of the filler particles can range from 20 to 900 square meters per gram, e.g., from 25 to 850 square meters per gram, as determined by the Brunauer, Emmett, Teller (BET) method according to ASTM C 819-77 using nitrogen as the adsorbate but modified by outgassing the system and the sample for one hour at 130° C. Prior to nitrogen sorption, filler samples are dried by heating to 160° C. in flowing nitrogen (PS) for 1 hour.

In a particular embodiment of the present invention, the inorganic filler comprises silica, for example, precipitated silica, silica gel, or fumed silica.

Silica gel is generally produced commercially by acidifying an aqueous solution of a soluble metal silicate, e.g., sodium silicate at low pH with acid. The acid employed is generally a strong mineral acid, such as sulfuric acid or hydrochloric acid, although carbon dioxide can be used. Inasmuch as there is essentially no difference in density between the gel phase and the surrounding liquid phase while the viscosity is low, the gel phase does not settle out, that is to say, it does not precipitate. Consequently, silica gel may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight.

Precipitated silica generally is produced commercially by combining an aqueous solution of a soluble metal silicate, ordinarily alkali metal silicate such as sodium silicate, and an acid so that colloidal particles of silica will grow in a weakly alkaline solution and be coagulated by the alkali metal ions of the resulting soluble alkali metal salt. Various acids may be used, including but not limited to mineral acids. Non-limiting examples of acids that can be used include hydrochloric acid and sulfuric acid, but carbon dioxide can also be used to produce precipitated silica. In the absence of a coagulant, silica is not precipitated from solution at any pH. In a non-limiting embodiment, the coagulant used to effect precipitation of silica may be the soluble alkali metal salt produced during formation of the colloidal silica particles, or it may be an added electrolyte, such as a soluble inorganic or organic salt, or it may be a combination of both.

Precipitated silica can be described as precipitated aggregates of ultimate particles of colloidal amorphous silica that have not at any point existed as macroscopic gel during the preparation. The sizes of the aggregates and the degree of hydration may vary widely. Precipitated silica powders differ from silica gels that have been pulverized in that the precipitated silica powders generally have a more open structure, that is, a higher specific pore volume. However, the specific surface area of precipitated silica, as measured by the Brunauer, Emmet, Teller (BET) method using nitrogen as the adsorbate, is often lower than that of silica gel.

Many different precipitated silicas can be employed as the filler used to prepare the microporous material. Precipitated silicas are well-known commercial materials, and processes for producing them are described in detail in many United States patents, including U.S. Pat. Nos. 2,940,830, 2,940,830, and 4,681,750. The average ultimate particle size (irrespective of whether or not the ultimate particles are agglomerated) of precipitated silicas used is generally less than 0.1 micrometer, e.g., less than 0.05 micrometer or less than 0.03 micrometer, as determined by transmission electron microscopy. Non-limiting examples of suitable precipitated silicas include those sold under the Hi-Sil® tradename by PPG Industries, Inc.

The inorganic filler particles can constitute from 10 to 90 percent by weight of the microporous membrane. For example, such filler particles can constitute from 25 to 90 percent by weight of the microporous membrane, such as from 30 percent to 90 percent by weight of the microporous membrane, or from 40 to 90 percent by weight of the microporous membrane, or from 50 to 90 percent by weight of the microporous membrane, and even from 60 percent to 90 percent by weight of the microporous membrane. The filler typically is present in the microporous membrane of the present invention in an amount ranging from 50 percent to about 85 percent by weight of the microporous membrane. Often, the weight ratio of filler to polyolefin in the microporous material ranges from 0.5:1 to 10:1, such as 1.7:1 to 3.5:1. Alternatively, the weight ratio of filler to polyolefin in the microporous material may be greater than 4:1. It is contemplated that higher levels of filler may be employed, as such levels of filler would provide higher surface area available for condensation reactions with the treatment compositions.

The microporous material used in the membrane of the present invention further comprises a network of interconnecting pores communicating throughout the microporous material.

On a treatment-free, coating free, or impregnant-free basis, such pores can comprise at least 5 percent by volume, e.g. from at least 5 to 95 percent by volume, or from at least 15 to 95 percent by volume, or from at least 20 to 95 percent by volume, or from at least 25 to 95 percent by volume, or from 35 to 70 percent by volume of the microporous material. Often, the pores comprise at least 35 percent by volume, or even at least 45 percent by volume of the microporous material. Such high porosity provides higher surface area throughout the microporous material, which in turn facilitates removal of contaminants from a fluid stream and higher flux rates of a fluid stream through the membrane.

As used herein and in the claims, the porosity (also known as void volume) of the microporous material, expressed as percent by volume, is determined according to the following equation:

Porosity=$100[1-d_1/d_2]$ wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the sample is determined using a Quantachrome Stereopycnometer (Quantachrome Corp.) in accordance with the accompanying operating manual.

Porosity also can be measured using a Gurley Densometer, model 4340, manufactured by GPI Gurley Precision Instruments of Troy, N.Y. The porosity values reported are a measure of the rate of air flow through a sample or it's resistance to an air flow through the sample. The unit of measure for this method is a "Gurley second" and represents the time in seconds to pass 100 cc of air through a 1 inch square area using a pressure differential of 4.88 inches of water. Lower values equate to less air flow resistance (more air is allowed to pass freely). For purposes of the present invention, the measurements are completed using the procedure listed in the manual for MODEL 4340 Automatic Densometer.

The volume average diameter of the pores of the microporous material can be determined by mercury porosimetry using an Autopore III porosimeter (Micromeretics, Inc.) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). If approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2[v_1 r_1/w_1 + v_2 r_2/w_2]/[v_1/w_1 + v_2/w2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan.

In the course of determining the volume average pore diameter of the above procedure, the maximum pore radius detected is sometimes noted. This is taken from the low pressure range scan, if run; otherwise, it is taken from the high pressure range scan. The maximum pore diameter is twice the maximum pore radius. Inasmuch as some production or treatment steps, e.g., coating processes, printing processes, impregnation processes and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

To prepare the microporous materials of the present invention, filler, polyolefin polymer (typically in solid form such as powder or pellets), processing plasticizer, and minor amounts of lubricant and antioxidant are mixed until a substantially uniform mixture is obtained. The weight ratio of filler to polymer employed in forming the mixture is essentially the same as that of the microporous material substrate to be produced. The mixture, together with additional processing plasticizer, is introduced to the heated barrel of a screw extruder. Attached to the extruder is a die, such as a sheeting die, to form the desired end shape.

In an exemplary manufacturing process, when the material is formed into a sheet or film, a continuous sheet or film formed by a die is forwarded to a pair of heated calender rolls acting cooperatively to form a continuous sheet of lesser thickness than the continuous sheet exiting from the die. The final thickness may depend on the desired end-use application. The microporous material may have a thickness ranging from 0.7 to 18 mil (17.8 to 457.2 microns), such as 0.7 to 15 mil (17.8 to 381 microns), or 1 to 10 mil (25.4 to 254 microns), or 5 to 10 mil (127 to 254 microns), and demonstrates a bubble point of 1 to 80 psi based on ethanol.

Optionally, the sheet exiting the calendar rolls may then be stretched in at least one stretching direction above the elastic limit. Stretching may alternatively take place during or immediately after exiting from the sheeting die or during calendaring, or multiple times during the manufacturing process. Stretching may take place before extraction, after extraction, or both. Additionally, stretching may take place during the application of the first and/or second treatment compositions, described in more detail below. Stretched microporous material substrate may be produced by stretching the intermediate product in at least one stretching direction above the elastic limit. Usually, the stretch ratio is at least about 1.2. In many cases, the stretch ratio is at least about 1.5. Preferably it is at least about 2. Frequently, the stretch ratio is in the range of from about 1.2 to about 15. Often, the stretch ratio is in the range of from about 1.5 to about 10. Usually, the stretch ratio is in the range of from about 2 to about 6.

The temperatures at which stretching is accomplished may vary widely. Stretching may be accomplished at about ambient room temperature, but usually elevated temperatures are employed. The intermediate product may be heated by any of a wide variety of techniques prior to, during, and/or after stretching. Examples of these techniques include radiative heating, such as that provided by electrically heated or gas fired infrared heaters; convective heating, such as that provided by recirculating hot air; and conductive heating, such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the intermediate product, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the intermediate product is stretched about evenly so that the variations, if any, in film thickness of the stretched microporous material are within acceptable limits and so that the amount of stretched microporous material outside of those limits is acceptably low. It will be apparent that the temperatures used for control purposes may or may not be close to those of the intermediate product itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the intermediate product. Also, because of such line speeds, it is impracticable to measure these temperature gradients. The presence of gradients of varying temperatures, when they occur, makes it unreasonable to refer to a singular film temperature. Accordingly, film surface temperatures, which can be measured, are best used for characterizing the thermal condition of the intermediate product. These are ordinarily about the same across the width of the intermediate product during stretching although they may be intentionally varied, as, for example, to compensate for intermediate product having a wedge-shaped cross section across the sheet. Film surface temperatures along the length of the sheet may be about the same or they may be different during stretching.

The film surface temperatures at which stretching is accomplished may vary widely, but in general they are such that the intermediate product is stretched about evenly, as explained above. In most cases, the film surface temperatures during stretching are in the range of from about 20° C. to about 220° C. Often, such temperatures are in the range of from about 50° C. to about 200° C. From about 75° C. to about 180° C. is preferred.

Stretching may be accomplished in a single step or a plurality of steps as desired. For example, when the intermediate product is to be stretched in a single direction (uniaxial stretching), the stretching may be accomplished by a single stretching step or a sequence of stretching steps until the desired final stretch ratio is attained. Similarly, when the intermediate product is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the intermediate product is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Various types of stretching apparatus are well known and may be used to accomplish stretching of the intermediate product. Uniaxial stretching is usually accomplished by stretching between two rollers, wherein the second or downstream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where the continuous sheet is being stretched, one stretching direction is at least approximately parallel to the long axis of the sheet (machine direction) and the other stretching direction is at least approximately perpendicular to the machine direction and is in the plane of the sheet (transverse direction).

Stretching the sheets prior to extraction of the processing plasticizer allows for thinner films with larger pore sizes than in microporous materials conventionally processed. It is also believed that stretching of the sheets prior to extraction of the processing plasticizer minimizes thermal shrinkage after processing. It also should be noted that stretching of the microporous membrane can be conducted at any point prior to, during, or subsequent to application of the first treatment composition (as described herein below), and/or prior to, during, or subsequent to application of the second treatment composition. Stretching of the microporous membrane can occur once or multiple times during the treatment process.

The product passes to a first extraction zone where the processing plasticizer is substantially removed by extraction with an organic liquid, which is a good solvent for the processing plasticizer, a poor solvent for the organic polymer, and more volatile than the processing plasticizer. Usually, but not necessarily, both the processing plasticizer and the organic extraction liquid are substantially immiscible with water. The product then passes to a second extraction zone where the residual organic extraction liquid is substantially removed by steam and/or water. The product is then passed through a forced air dryer for substantial removal of residual water and remaining residual organic extraction liquid. From the dryer, the microporous material may be passed to a take-up roll, when it is in the form of a sheet.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil, such as paraffinic oil, naphthenic oil, or aromatic oil. Suitable processing oils include those meeting the requirements of ASTM D 2226-82, Types 103 and 104. Those oils which have a pour point of less than 22° C., or less than 10° C., according to ASTM D 97-66 (reapproved 1978) are used most often. Examples of suitable oils include Shellflex® 412 and Shellflex® 371 oil (Shell Oil Co.), which are solvent refined and hydrotreated oils derived from naphthenic crude. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used in the process of manufacturing the microporous membrane. Examples of suitable organic extraction liquids include, but are not limited to, 1,1,2-trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane and toluene. One or more azeotropes of halogenated hydrocarbons selected from trans-1,2-dichloroethylene, 1,1,1,2,2,3,4,5,5,5-decafluoropentane, and/or 1,1,1,3,3-pentafluorobutane also can be employed. Such materials are available commercially as VERTREL™ MCA (a binary azeotrope of 1,1,1,2,2,3,4,5,5,5-dihydrodecafluoropentane and trans-1,2-dichloroethylene: 62%/38%) and VERTREL™ CCA (a ternary azeotrope of 1,1,1,2,2,3,4,5,5,5-dihydrodecafluorpentane, 1,1,1,3,3-pentafluorobutane, and trans-1,2-dichloroethylene: 33%/28%/39%); Vertrel™ SDG (80-83% trans-1,2-dichloroethylene, 17-20% hydrofluorocarbon mixture) all available from MicroCare Corporation.

In the above-described process for producing microporous membrane, extrusion and calendering are facilitated when the filler carries much of the processing plasticizer. The capacity of the filler particles to absorb and hold the processing plasticizer is a function of the surface area of the filler. Therefore, the filler typically has a high surface area as discussed above. Inasmuch as it is desirable to essentially retain the filler in the microporous material substrate, the filler should be substantially insoluble in the processing plasticizer and substantially insoluble in the organic extraction liquid when microporous material substrate is produced by the above process. The residual processing plasticizer content is usually less than 15 percent by weight of the resulting microporous material and this may be reduced even further to levels, such as less than 5 percent by weight, by additional extractions using the same or a different organic extraction liquid. The resulting microporous materials may be further processed depending on the desired application.

As previously mentioned, the method for treating a surface of a microporous membrane (as described above), comprises sequentially (1) contacting at least one surface of the membrane with a treatment composition comprising a silane-functional polyamine compound having at least one alkoxysilane group, wherein the silane-functional polyamine compound is in intimate contact with the inorganic filler present in the matrix; and (2) subjecting the membrane of (1) to conditions sufficient to effect a condensation reaction between the inorganic filler and the silane groups of the silane-functional polyamine compound. As used herein, in the specification and the claims, in regards to the silane-functional polyamine compound applied in (1), by "polyamine" is meant a compound having at least three amino groups.

Generally, the silane-functional polyamine compound present in the treatment composition comprises a silane functional derivative of an amine-containing compound selected from the group consisting of polyethyleneimine, amino group-containing polysaccharide, N-(3-aminopropyl)-1,4-butanediamine, N, N'-bis(3-aminopropyl)-1,4-butanediamine, N-(3-aminopropyl)-N'-[3-[(3-aminopropyl)amino]propyl]propane-1,3-diamine, 1,13-diamino-5,9-diazatridecane, triethylene tetraamine, diethylene triamine, 1-(2-aminoethyl)piperazine, and mixtures thereof. In a particular embodiment of the present invention, the silane functional amino group-containing polysaccharide comprises a silane functional polyglucosoamine. Suitable silane-functional polyamines also can include, for example, 3-trimethoxysilylpropyl)diethylenetriamine, trimethoxysilylpropyl modified (polyethyleneimine), and dimethoxysilylmethylpropyl modified (polyethyleneimine), all of which are commercially available from Gelest, Inc.

The silane-functional polyamine compound can comprise the reaction product of (i) a polyamine having at least one primary amino group and/or at least one secondary amino group with (ii) an epoxy-functional silane. Suitable polyamines for use as the polyamine (i) can include, but are not limited to, any of the polyamines mentioned immediately above, as well as mixtures thereof. Suitable epoxy-functional silanes for use as the epoxy-functional silane (ii) can be any of those selected from the group consisting of di-epoxy functional silanes, epoxy cyclohexylsilanes, epoxy cyclohexylalkyl silanes, glycidoxyalkyl silanes, and mixtures thereof. In a particular embodiment of the present invention, the epoxy-silane compound (ii) comprises a glycidoxyalkyl silane selected from the group consisting of (3-glycidoxypropyl) trialkoxysilane, (3-glycidoxypropyl) bis(trimethylsiloxy)methylsilane, (3-glycidoxypropyl) dimethylethoxysilane, (3-glycidoxypropyl) methyldiethoxysilane, and mixtures thereof.

The reaction of a polyamine with an epoxy-functional silane containing at least one condensable or hydrolysable group may be performed "near" or in the presence of a solvent. The reaction of a polyamine with an epoxy-functional silane may be performed in a polar solvent. Some non-limiting examples of suitable polar solvents that may be used include water or alcohol, such as any of the $C_1$ to $C_6$ alcohols described in detail herein below, or mixtures of water and one or more of the $C_1$ to $C_6$ alcohols. An acid, such as any of those described in detail herein below, may be present to aid dissolution of the polyamine. The acid may be present in an amount from greater than 0 up to and including 10 percent, such as from greater than 0 up to and including 5 percent, or from 1 to 2 percent. This solution may be used as the treatment composition comprising a silane-functional polyamine, or a portion of the solvent may be removed, for example, by stripping or distillation techniques as are well known in the art. Also, the reaction of a polyamine with an epoxy-functional silane may be achieved via heating. The exact reaction temperature depends on a variety of factors, including the specific reactants selected and the type of solvent used. Temperatures, however, generally range from ambient to 90° C. and reaction time may be several hours, such as up to 5 hours, for example from 0.5 hour to 2 hours.

Typically, the molar ratio of the sum of primary and secondary amino groups present in the polyamine (i) to epoxy groups present in the epoxy-functional silane (ii) ranges from 1:1 to 10:1, such as from 3:1 to 50:1, or 4:1 to 40:1, or 6:1 to 25:1.

The treatment composition applied to the membrane in step (1) of the method of the present invention can further comprise a silane-functional monoamine, such as any of those known in the art. For example, the treatment composition can comprises a silane-functional monoamine selected from the group consisting of aminopropyltriethoxysilane, aminopropyltrimethoxysilane, aminobutyltriethoxysilane, aminobutyltrimethoxysilane, aminophenyltrimethoxysilane, 3-aminopropyltris (methoxyethoxyethoxy) silane, 11-aminoundecyltriethoxysilane, 2-(4-pyridylethyl)triethoxysilane, aminopropylsilanetriol, 3-(m-aminophenoxy)propyltrimethoxy silane, 3-aminopropylmethyldiethoxysilane, 3-aminopropylmethyldiethoxysilane silane, 3-aminopropyldimethylethoxysilane, and mixtures thereof.

The treatment composition can be in the form of an aqueous composition. The aqueous treatment composition can be an acidic aqueous composition or a basic aqueous composition. Further, the treatment composition also may include a $C_1$ to $C_6$ alcohol, either alone (as the sole solvent) or in combination with water. Such suitable $C_1$ to $C_6$ alcohols can be any of those selected from the group consisting of methanol, ethanol, 1-propanol, isopropanol, 1-butanol, 2-butanol, 1-hexanol, and mixtures thereof.

Suitable acids for use in the preparation of the aqueous acidic treatment composition can include, but are not limited to, those selected from the group consisting of acetic acid, hydrochloric acid, sulfuric acid, nitric acid, carbonic acid, lactic acid, citric acid, phosphoric acid, oxalic acid, and mixtures thereof. Suitable bases for use in the preparation of the aqueous basic treatment composition can include, but are not limited to, a base selected from the group consisting of ammonium hydroxide, sodium hydroxide, potassium hydroxide, lithium hydroxide, calcium hydroxide, and mixtures thereof.

As mentioned above, the treatment composition applied to the microporous membrane in the method of the present invention also may comprise an alcohol, either as the sole solvent or in combination with water.

The treatment composition can be applied to the microporous membrane by any application means known in the art. For example, the treatment composition can be applied to at least one surface of the microporous membrane by immersion, spray, dip, and/or flow or certain application techniques. The treatment composition may be applied after plasticizer extraction and either prior to, during, or after any of the stretching steps previously described. Alternatively, stretching can be delayed until application of the treatment composition. Upon application of the treatment composition to at least one surface of the microporous membrane in (1), the membrane of (1) is (2) subjected to conditions sufficient to effect a condensation reaction between the functional groups present on the surface of the inorganic filler and the silane groups of the silane-functional polyamine compound. Such reaction conditions will be discussed in more detail herein below.

Further, the treatment composition can be applied in multiple steps. That is, the microporous membrane can be contacted in (1) with one or more applications of the treatment composition(s). Moreover, the treatment compositions applied in such multi-step applications can be the same or different compositions, provided each composition comprises at least one silane-functional polyamine compound. It also should be noted that any of the previously described treatment compositions suitable for application to the microporous membrane of (1) in accordance with the method of the present invention can further comprise at least one nonionic surfactant as described immediately below, as well as a polyalkylene oxazoline such as polyethylene oxazoline.

Non-limiting examples of suitable nonionic surfactants for use in the treatment composition used in the method of the present invention can include, but are not limited to, polyalkylene oxide alkyl ethers, wherein the alkyl group can be straight chain or branched having a chain length of from $C_6$ to $C_{22}$; polyalkylene oxide alkyl esters, wherein the alkyl group can be straight chain or branched having a chain length of from $C_6$ to $C_{22}$; organic amines with straight or branched carbon chains from $C_6$ to $C_{22}$ having the general formula R*NR'R", wherein R* can be from $C_8$ to $C_{22}$ alkyl and R' and R" can each independently be H or $C_1$ to $C_4$ alkyl, such that the molecule can be substantially soluble or substantially emulsifiable in water, for example octadecylamine; tertiary amines with carbon chains from $C_6$ to $C_{22}$; polyethyleneimines; polyacrylamides; glycols and alcohols with straight chain or branched alkyl from $C_6$ to $C_{22}$ that can form ester linkage (—SiOC—), polyvinyl alcohol; and mixtures thereof.

The nonionic surfactant also can be chosen from polyalkylene oxide ethers such as polypropylene oxide ethers and polyethylene oxide ethers such as but not limited to hexaethylene glycol monododecylether, hexaethylene glycol monohexadecylether, hexaethylene glycol monotetradecylether, hexaethylene glycol monooctadecylether, heptaethylene glycol monododecylether, heptaethylene glycol monohexadecylether, heptaethylene glycol monotetradecylether, heptaethylene glycol monooctadecylether, nonaethylene glycol monododecylether, octaethylene glycol monododecylether; polyalkylene oxide esters, for example polypropylene oxide esters and polyethylene oxide esters such as but not limited to hexaethylene glycol monododecylester, hexaethylene glycol monohexadecylester, hexaethylene glycol monotetradecylester, hexaethylene glycol monooctadecylester, heptaethylene glycol monododecylester, heptaethylene glycol monohexadecylester, heptaethylene glycol monotetradecylester, heptaethylene glycol monooctadecylester, nonaethylene glycol monododecylester, octaethylene glycol monododecylester; polysorbate esters such as polyoxyethylene sorbitan mono fatty acid esters including but not limited to polyoxyethylene sorbitan mono palmitate, polyoxyethylene sorbitan mono oleate, polyoxyethylene sorbitan mono stearate, polyoxyethylene sorbitan difatty acid esters such as polyoxyethylene sorbitan dipalmitate, polyoxyethylene sorbitan dioleate, polyoxyethylene sorbitan distearate, polyoxyethylene sorbitan monopalmitate monooleate, polyoxyethylene sorbitan tri fatty acid esters such as but not limited to polyoxyethylene sorbitan tristearate; and mixtures thereof.

In a particular embodiment, the treatment composition used in the method of the present invention can comprise a nonionic surfactant selected from block copolymers based on poly(ethylene glycol), for example, block copolymers of poly(propylene glycol) and poly(ethylene glycol), (such as the triblock copolymer PLURONIC® 17R2 which is commercially available from BASF Corporation); cetylstearyl alcohol; polyethylene glycol and derivatives thereof, for example, polyoxyethylene octyl phenyl ether; polyalkyl glycols; cetyl alcohol; cocamide mono- or di-ethanolamine; decyl gylcoside; octylphenoxypolyethoxyethanol; isocetyl alcohol; lauryl glucoside; monolaurin; fatty alcohol polyglycol ethers; polyglycol ethers; polyethylene glycol derivatives of mono or diglycerides; mono and poly glycerol derivatives, for example, polyglycerol polyricinoleate; sorbitan esters; polysorbates and oxidized polyethylene. Mixtures of any of the aforementioned nonionic surfactants can be used.

As discussed above, the method for treating a surface of a filled microporous membrane in accordance with the present invention further comprises (2) subjecting the membrane of (1) to conditions sufficient to effect a condensation reaction between the inorganic filler and the silane-functional polyamine compound. In the "wet method", the aqueous acid treatment composition or the aqueous basic treatment composition (as the case may be) can be applied to one or more surfaces of the microporous membrane as described above, or the aqueous acid treatment composition or the aqueous basic treatment composition can be passed through the microporous membrane at elevated pressure, in order to effect the condensation reaction between the inorganic filler and the silane-functional polyamine compound. In this wet method, the condensation reaction in (2) can be effected at ambient temperature. The wet method can be used effectively to treat or reclaim/clean a microporous membrane which is in the form of a sheet or when the microporous membrane is a component of an existing or pre-fabricated separation device, such as the filter membrane component of a spiral wound or pleated filter device, or a separation membrane as a component of a battery (i.e., a battery separator).

In the "dry method" of effecting the condensation reaction in step (2) of the method of the present invention, the condensation reaction between the inorganic filler and the silane-functional polyamine compound is effected by exposing the treated microporous membrane of (1) to elevated temperatures. The temperature generally ranges from 50° C. to 145° C. Such temperatures are sufficient to effect at least a condensation reaction in (2). The dry method is particularly useful for treatment of microporous membranes in the form of a sheet. The dry method can be initiated on a microporous membrane prior to any stretching, or after machine direction stretching and prior to a cross direction stretching, or the dry method can be initiated on a microporous membrane that has already undergone biaxial stretching. Also, when the dry method is employed, the microporous membrane may be stretched during the drying/heating step in addition to or instead of stretching prior to treatment with the treatment composition. During application of the treatment composition in the dry method, it should be noted that the microporous membrane to which the respective treatment composition is applied should be held dimensionally stable during said application. Further, during the dry method drying/heating steps, the membrane typically is held under tension in order to prevent/minimize shrinkage, regardless of whether the stretching is occurring simultaneously.

It should be noted herein that the wet and dry method steps can be combined, if desired. That is, the condensation reaction can be effected by application of an aqueous treatment composition (either an aqueous acidic composition or an aqueous basic composition) at ambient temperature, then the membrane treated thusly can be subjected to elevated temperatures, or vice versa.

The present invention also provides microporous membranes prepared by any of the various methods described above.

The methods for treating a surface of a filled microporous membrane in accordance with the present invention differ significantly from the heretofore known methods where conventional hydrophilic coatings are applied to the surfaces of the microporous membranes. In the methods of the present invention, the components of the treatment composition interact chemically with the inorganic filler at all exposed surfaces in and on the membrane, including within the pores. The components are reacted via condensation to form a permanent surface which imparts hydrophilic character over the entire membrane, including the surfaces of the pores without occluding the pores. Such methods result in the treatment being bound to the surface of the membrane and the interior of the pores via covalent interaction with the inorganic filler particles. Hence, the treatment is not removed by normal physical or chemical usage (e.g., by cleaning with a basic cleaning solution). It has been found that, when used in oil-water separation applications, the membranes prepared by the methods of the present invention exhibit a longer practical lifetime as evidenced by decreased fouling, improved flux rates over extended periods of time, and robustness against cleaning procedures as compared to an equivalent, untreated membrane. Such membranes also can demonstrate lower shrinkage (i.e., the membranes maintain the integrity of the pores) as compared to an equivalent untreated membrane. This is particularly true for the membranes of the present invention, which are prepared using the dry method as mentioned above.

The present invention is more particularly described in the following examples which are intended to be illustrative only, since numerous modifications and variations therein will be apparent to those skilled in the art.

EXAMPLES

Part 1: Substrate Preparation

A membrane was prepared in accordance with Example 4 in U.S. Publication No. 2013/0228529A1. The extruded sheet was then stretched in both the Machine and Cross Directions. Machine Direction stretching was carried out at 270° F. with a slow draw roll set at 15 FPM and fast draw roll set at 28 FPM. Cross Machine stretching was carried out at 270° F. and a stretching ratio of 2 to 1.

For all examples and comparative examples described below, a sheet of the microporous membrane prepared above was cut to approximately 7"×7" and clamped to the outer perimeter of a 5"×5" metal square frame, fabricated from ¾" square tubular metal stock, with excess slack removed. The frame with fitted sheet was placed on a flat counter, with the continuous sheet or top side facing up. This orientation was maintained through each of the treatment steps.

Part 2: Preparation of Treatment Solutions

Part 2.1: Silane-Functional Polyamine Solutions

For each solution, the water and/or 2-propanol indicated in Table 1 were added to a polyethylene beaker fitted with an air-driven paddle stirrer. To this was added the indicated amount of silane-functional polyamine. The mixture was stirred for a minimum of 30 minutes prior to using in Part 3.

TABLE 1

Treatment Compositions

| Ingredients (Parts by Weight) | Solutions | | | |
|---|---|---|---|---|
| | A | B | C | D |
| Water | — | 85.0 | — | 44.0 |
| 2-propanol | — | 5.0 | 25.0 | 6.0 |
| 50% Trimethoxysilypropyl-polyethylenimine[1] | 100 | 10.0 | — | — |
| Trimethoxysilylpropyl diethylenetriamine[2] | — | — | 75.0 | 50.0 |

[1] Trimethoxysilylpropyl-polyethylenimine: A 50% solution in isopropyl alcohol, sold under the product code SSP-060 by Gelest, Inc.
[2] Trimethoxysilylpropyl diethylenetriamine was purchased from Gelest, Inc.

Part 2.2: In-situ Generated Silane-Functional Polyamine Solutions

The ingredients listed in Table 2 below were added in order to a polyethylene beaker fitted with an air-driven paddle stirrer. After the addition of either chitosan or poly(ethyleneimine), the mixture was stirred at least two hours until the materials were completely dissolved. After the siloxane was added, each mixture was heated to 80° C. and stirred for 60 minutes. The surfactant was added to the chitosan solution and stirred an additional 15 minutes. The solutions were cooled to room temperature prior to use. Both solutions had a measured pH of between 8 and 9.

TABLE 2

Treatment Compositions for In-Situ Silane-Functional Polyamines

| Ingredients (Parts by Weight) | Solutions | |
|---|---|---|
| | E | F |
| Water | 43.3 | 94.0 |
| Acetic acid (98%) | — | 2.0 |
| Chitosan (75% deacetylated) | — | 1.0 |
| Poly(ethyleneimine)[1] | 7.9 | — |
| 2-propanol | 49.5 | — |
| 3-aminopropyltriethoxysilane | — | 1.0 |
| 3-glycidoxypropyl trimethoxysilane | 1.0 | — |
| PLURONIC ® 17R2[2] | — | 2.0 |

[1] Branched polyethyleneimine with reported average Mn of 10 000 and Mw of 25,000 purchased from Sigma-Aldrich under the product number 408727.
[2] A block copolymer surfactant, available from BASF Corporation.

Part 3: Sample Preparation

Dry Process: The treatment solution, as listed in Table 3 below, was liberally applied to the top side of the sheet using a disposable dropper until the liquid was clearly wet through the sheet as determined by observation of constant sheet transparency upon addition of more solution. Total solution application and wet through required approximately one minute to complete. Excess free liquid was gently wiped from all membrane surfaces. The treated membranes were then post-treated with heat in a forced air oven set at 130° C. for 15 minutes. Then, the framed membrane was placed on the counter top with the top side of the sheet facing up and allowed to cool to room temperature prior to testing.

TABLE 3

Dry Process Examples

| Examples | Solution Formulation |
|---|---|
| Ex-1 | A |
| Ex-2 | B |
| Ex-3 | C |
| Ex-4 | D |
| Ex-5 | E |
| Ex-6 | F |

Wet Process: The treatment solution, as designated in Table 4 below, was applied in the same manner as above. Excess free liquid was gently wiped from all membrane surfaces, and the framed membrane was placed in an air tight plastic bag for 15 minutes to prevent evaporation. The treated membranes were kept moist in the bag until testing.

TABLE 4

Solution Formulations for Wet Processed Examples Treated with Single Solution

| Examples | Solution Formulation |
|---|---|
| Ex-7 | A |
| Ex-8 | B |
| Ex-9 | C |
| Ex-10 | D |
| Ex-11 | E |
| Ex-12 | F |

Multistep Process: The treatment solution, as listed in Table 5 below, first was applied in the same manner as above. Any excess free liquid was gently wiped from all membrane surfaces and the framed membrane was placed in an air tight plastic bag for 15 minutes to prevent evaporation. The assembly was then removed from the bag, and the membrane then was treated with a 0.25% or 0.50% chitosan solution prepared in 1% aqueous acetic acid (by weight) until the liquid no longer absorbed into the membrane, as evidenced by standing liquid on the surface, which was then wiped off and followed by a hold time of 15 minutes in an air tight plastic bag between each step. Two of the examples were further treated with a solution of glutaraldehyde in the same manner. The treated membranes were kept moist in the bag until testing.

TABLE 5

Solution Formulations for Examples Treated with Multiple Solutions

| Examples | 1$^{st}$ Treatment Solution | 2$^{nd}$ Treatment Solution | 3$^{rd}$ Treatment Solution |
|---|---|---|---|
| Ex-13 | B | 0.25% chitosan | — |
| Ex-14 | B | 0.50% chitosan | 0.2% glutaraldehyde |
| Ex-15 | D | 0.25% chitosan | — |
| Ex-16 | D | 0.50% chitosan | 0.2% glutaraldehyde |

CE-17 utilized the membrane prepared in Part 1 with no further treatment.

Comparative Example (CE) 18 utilized a hydrophilic coating solution of 6 g SELVOL® 325 polyvinyl alcohol (supplied by Sekisui Specialty Chemicals America) in 294 g cool water. This coating solution was liberally applied to the top side of the membrane described in Part 1 using a disposable dropper until transparency was unchanged with additional solution. Any excess free liquid was gently wiped from the membrane surface. The membrane was then post-treated with heat in a forced air oven set at 105° C. for 15 minutes.

CE-19 utilized a hydrophilic coating solution prepared in accordance with Part III, Example A in U.S. Publication No. 2014/0069862A1, but using 10 g of the polyethyloxazoline in the formulation. This coating solution was applied to the membrane described in Part 1 in the same manner as above. Any excess free liquid was gently wiped from the membrane surface. The membranes were then post-treated with heat in a forced air oven set at 105° C. for 15 minutes.

Part 4: Physical Properties of Treated Membranes

The membranes prepared in Part 3 were tested for the physical properties described below.

Gurley: This test was performed only on dry membrane samples. Porosity was determined using a Gurley Precision Densometer, model 4340, manufactured by GPI Gurley Precision Instruments of Troy, N.Y. The testing area was 1 in$^2$ and the result reported as Gurley seconds per 100 cc of air.

Contact angle: was measured on a VCA 2500XE video contact angle system, available from AST Products, Inc. using 1 microliter of ultrapure water. Contact angles were measured on dry process samples only.

Dry wet shrinkage test: 8 cm by 8 cm sample coupons of the treated materials were used. For wet-treatment samples, the coupons were cut from the finished membrane and allowed to dry at room temperature overnight. Dry-treatment samples were soaked in deionized water for one hour. Those with water contact angles greater than 10 were pre-wet with a 50/50 water/isopropyl alcohol solution then rinsed with and soaked for one hour in deionized water. After soaking, the samples were removed from the water bath and air dried at room temperature overnight. The resultant samples were measured 3 times in both the cross (CD) and machine (MD) directions, the values averaged, and the shrinkage calculated and reported as a percentage of the original pre-wet sample coupons in Table 7. Gurley and water contact angles are only pertinent on wet-process samples.

TABLE 7

Physical Properties of Examples and Comparative Examples

| Examples | Process | Gurley (sec) | Water Contact Angle | Wet/Dry Shrinkage (%) | |
|---|---|---|---|---|---|
| | | | | CD | MD |
| Ex-1 | Dry | 170 | <10 | 0 | 0 |
| Ex-2 | | 48 | 40 | 10 | 7.5 |
| Ex-3 | | 250 | 20 | 2.5 | 0 |
| Ex-4 | | 200 | <10 | 2 | 2.5 |
| Ex-5 | | 1085 | 20 | 2 | 4 |
| Ex-6 | | 86 | <10 | 0 | 0 |
| Ex-7 | Wet | — | — | 32 | 20 |
| Ex-8 | | — | — | 12.5 | 7.5 |
| Ex-9 | | — | — | 32.5 | 25 |
| Ex-10 | | — | — | 34 | 25 |
| Ex-11 | | — | — | 32 | 25 |
| Ex-12 | | — | — | 30 | 20 |
| Ex-13 | | — | — | 22 | 10 |
| Ex-14 | | — | — | 22.5 | 7.5 |
| Ex-15 | | — | — | 15 | 10 |

TABLE 7-continued

Physical Properties of Examples and Comparative Examples

| Examples | Process | Gurley (sec) | Water Contact Angle | Wet/Dry Shrinkage (%) | |
|---|---|---|---|---|---|
| | | | | CD | MD |
| Ex-16 | | — | — | 15 | 10 |
| CE-17 | Comparative | 39 | 113.5 | 34 | 16 |
| CE-18 | | 2389 | 37 | 36 | 16 |
| CE-19 | | 46 | <10 | 34 | 12 |

Part 5: Performance Testing of Treated Membranes

Each of the prepared membranes of Part 3 were tested for the following performance properties:

Water flux: Water flux was tested with a Sterlitech filter holder with a membrane area of 90 cm$^2$. The Sterlitech unit fitted with the membrane was charged with 1 liter of water and sealed. The air pressure was set to 50 psi and the time required for the 1 liter quantity of water to pass through the membrane was recorded. The corresponding water flux was calculated.

Oil resistance: The water-wetted membrane of interest was removed from the water flux test equipment above and immediately evaluated for oil resistance. Three drops of oil were placed on the membrane surface using a disposable dropper. All three drops were allowed to remain undisturbed for approximately one minute then wiped off using a paper wipe. If the oil drop penetrated and stained the membrane, the result was given a rating of 1. If the oil drop remained mostly on the surface but clearly stained the membrane, the result was given a rating of 2. If the oil drop remained at the surface, did not penetrate the membrane and/or only slightly stained the surface, the result was given a rating of 3.

Oil absorption test: A 2 cm by 2 cm coupon of membrane was completely submerged into 100% crude oil for 24 hours. The sample was then removed from the oil bath and all excess oil wiped from the surface. The resultant sample was placed in a beaker filled with 100 ml of hexane, allowed to soak for 5 minutes, and then removed. The corresponding oil concentration in the hexane soak was determined with a TD-3100 from Turner Design Hydrocarbon Instruments.

Water/oil extrusion pressure test: A 200 ml quantity of a 50/50 volume blend of water and Texas crude oil (purchased from Texas Crude) was used for the test along with a Sterlitech filter holder with a membrane area of 90 cm$^2$. Once the Sterlitech unit was fully fitted and charged, the test was initiated at a pressure of 5 psi and then the pressure was increased by 2.5 psi increments every 10 minutes. The pressures at which water and then oil passed through the membrane were recorded. The difference between these two pressures is recorded in Table 8 as AP oil-water. The performance results presented in Table 7 below illustrate that the microporous membranes prepared by the methods of the present invention demonstrate higher oil resistance and lower oil absorption than other hydrophilic coatings known in the art (comparative examples). Low AP values (less than or equal to 5 psi) directly correlate to oil-contaminated permeate in practical use.

TABLE 8

Performance of Treated Membranes

| Examples | Process | Water Flux (ml/min/cm²) | Oil Resistance | Oil Absorption (mg/cm²) | ΔP Oil-Water (psi) |
|---|---|---|---|---|---|
| Ex-1 | Dry | 11.60 | 2 | 9.00 | 7.5 |
| Ex-2 | | 28.82 | 2 | 8.30 | 7.5 |
| Ex-3 | | 8.10 | 3 | 9.20 | 10 |
| Ex-4 | | 11.31 | 3 | 7.50 | 10 |
| Ex-5 | | 2.438 | 2 | 10.88 | Not measured |
| Ex-6 | | 10.62 | 3 | 3.315 | Not measured |
| Ex-7 | Wet | 6.25 | 3 | 11.20 | 7.5 |
| Ex-8 | | 21.44 | 2 | 8.79 | 7.5 |
| Ex-9 | | 23.80 | 3 | 9.40 | 7.5 |
| Ex-10 | | 23.43 | 3 | 8.50 | 10 |
| Ex-11 | | 9.33 | 3 | 7.40 | 7.5 |
| Ex-12 | | 13.70 | 2 | 12.43 | Not measured |
| Ex-13 | | 18.82 | 3 | 8.30 | 15 |
| Ex-14 | | 11.44 | 3 | 5.30 | 20 |
| Ex-15 | | 12.10 | 3 | 5.50 | 15 |
| Ex-16 | | 9.60 | 3 | 3.40 | 20 |
| CE-17 | Comparative | 22.4 | 1 | 14.5 | 5 |
| CE-18 | | 0.6 | 2 | 9.1 | N/A[1] |
| CE-19 | | 18.4 | 1 | 9.0 | 5 |

[1]ΔP not measurable due to very low flux.

Part 6: Treatment and Testing of Fabricated Filtration Cartridge

The membrane described in Part 1 was assembled into two industry standard 1812 size spiral wound cartridges with a single leaf design. The cartridges each contained 3.5 ft² of active membrane area with a 35 mil (899 micron) thick feed space. One of these cartridges was left untreated and the other was treated as follows. The cartridge treatment system comprised an ARO double diaphragm pump, valves, piping, fittings, pressure and flow gauges positioned in a secondary containment base with dimensions 24"×18". The tallest point of the assembly was 24". The system was designed to cycle liquids under pressure through an 1812 cartridge. One liter of treatment solution B was pumped through the cartridge for 1 minute at a peak pressure of 20 psi, held in the cartridge for 15 minutes, and drained out by gravity. Following this, one liter of each of the solutions described in Table 5, Example 15, were pumped through the cartridge for 5 minutes at a peak pressure of 20 psi, held in the cartridge for 15 minutes, then drained by gravity. The cartridge was finally treated with one liter of water for 15 minutes under continuous pumping prior to testing.

The treated cartridge and the untreated cartridge were each assembled into an 1812 RO membrane housing with ¼ inch port in the feed inlet. A salt/oil/water mixture designed to simulate produced water was used for the testing, the composition of which is detailed in Table 9.

TABLE 9

Salt/oil/water Formulation

| Components | (%) |
|---|---|
| Ca(NO₃)₂*4H₂O | 3.92 |
| MgSO₄ | 0.15 |
| NaCl | 4.58 |
| NaNO₃ | 0.74 |
| FeCl₃(50%) | 0.01 |
| K₂CO₃ | 0.02 |
| Sodium dodecylbenzene sulfonate | 0.025 |
| Texas Crude Oil | 0.25 |
| Water | 90.35 |

The salt/oil/water solution was pumped through each of the test cartridges at a feed flow of 3 gallons/minute. The feed return and permeate were directed back into the original sourcing container and the feed pressure, flow and temperature were each recorded with time. An additional 300 ppm of oil was added every 8 hours throughout the test to simulate constant use conditions. The permeate flow rate was recorded over time and reported as GFD (Gal/ft²day). The results are displayed graphically in FIG. 1 ("Flux versus Time").

Figure 1:
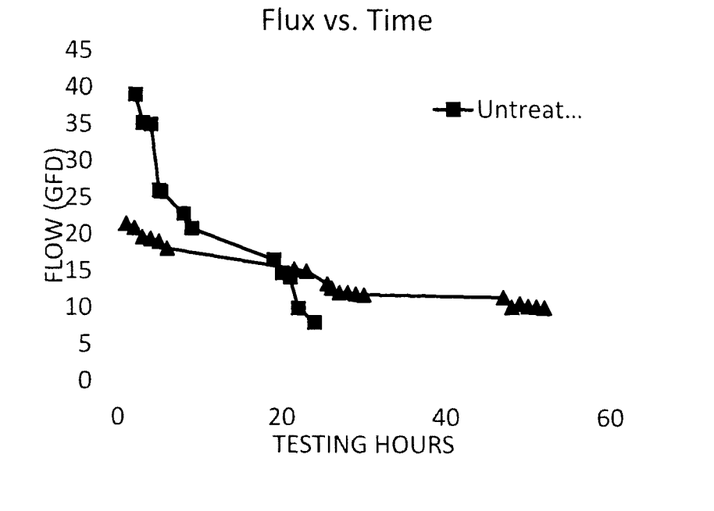
FIG. 1 depicts the graphical representation of flow (flux) versus time for a solution pumped through test filters comprising a membrane treated in accordance with the method of the present invention as compared with a test filter comprising an untreated membrane.

The test results presented in FIG. 1 illustrate the reduced fouling of a membrane prepared by the methods of the present invention (incorporated as a component in a filter cartridge) compared to an untreated membrane (incorporated as a component in an analogous filter cartridge). This reduced fouling contributes significantly to a longer useful lifetime of the cartridge.

Whereas particular embodiments of this invention have been described above for purposes of illustration, it will be evident to those skilled in the art that numerous variations of the details of the present invention may be made without departing from the scope of the invention as defined in the appended claims.

The invention claimed is:

1. A method for treating a surface of a microporous membrane, the membrane comprising
   a polyolefinic polymeric matrix, wherein the polyolefinic polymeric matrix consists essentially of a polyolefin selected from the group consisting of ultrahigh molecular weight polyethylene, ultrahigh molecular weight polypropylene, high density polyethylene, high density polypropylene, and mixtures thereof;
   a finely divided particulate, substantially water-insoluble inorganic filler distributed throughout the polyolefinic polymeric matrix, wherein the inorganic filler is selected from the group consisting of silica, alumina, calcium oxide, zinc oxide, magnesium oxide, titanium oxide, zirconium oxide, and mixtures thereof; and a
   network of interconnecting pores communicating throughout the microporous membrane,
   the method comprising in sequence:
   (1) contacting at least one surface of the membrane with a treatment composition comprising a silane-functional polyamine compound having at least one alkoxy silane group, wherein the treatment composition comprises (i) an acidic aqueous composition, or (ii) a basic aqueous composition, such that the silane-functional polyamine compound is in intimate contact with the filler present in the polyolefinic polymeric matrix; and
   (2) effecting a condensation reaction between the inorganic filler which is distributed throughout the polyolefinic polymeric matrix and the silane-functional polyamine compound (i) by subjecting the membrane of (1) to ambient temperature for a time sufficient to effect the condensation reaction, and/or (ii) by subjecting the membrane of (1) to temperatures ranging from 50° C. to 145° C.

2. The method of claim 1, wherein the silane-functional polyamine compound comprises a silane-functional derivative of an amine-containing compound selected from the group consisting of polyethyleneimine, amino group-containing polysaccharide, N-(3-aminopropyl)-1,4-butanediamine, N,N'-bis(3-aminopropyl)-1,4-butanediamine, N-(3-aminopropyl)-N'-[3-[(3-aminopropyl)amino]propyl]propane-1,3-diamine, 1,13-diamino -5,9-diazatridecane, triethylene tetraamine, diethylene triamine, 1-(2-aminoethyl)piperazine, and mixtures thereof.

3. The method of claim 2, wherein the silane-functional polyamine compound comprises a silane-functional amino group-containing polysaccharide which comprises a silane-functional polyglucosoamine.

4. The method of claim 1, wherein the silane-functional polyamine is selected from the group consisting of 3-(trimethoxysilylpropyl)diethylenetriamine, trimethoxysilylpropyl modified (polyethyleneimine), dimethoxysilylmethylpropyl modified (polyethyleneimine), and mixtures thereof.

5. The method of claim 1, wherein the silane-functional polyamine compound comprises the reaction product of (i) a polyamine having at least one primary amino group and/or at least one secondary amino group with (ii) an epoxy-functional silane.

6. The method of claim 5, wherein the polyamine (i) is selected from the group consisting of polyglucosamine, polyethyleneimine, triethylene tetraamine, diethylene triamine, 1-(2-aminoethyl)piperazine, and mixtures thereof.

7. The method of claim 5, wherein the epoxy-functional silane (ii) is selected from the group consisting of di-epoxy functional silanes, epoxy cyclohexylsilanes, epoxy cyclohexylalkyl silanes, glycidoxyalkyl silanes, and mixtures thereof.

8. The method of claim 7, wherein the epoxy-silane compound is a glycidoxyalkyl silane selected from the group consisting of (3-glycidoxypropyl) trialkoxysilane, (3-glycidoxypropyl) bis(trimethylsiloxy)methylsilane, (3-glycidoxypropyl) dimethylethoxysilane, (3-glycidoxypropyl) methyldiethoxysilane, and mixtures thereof.

9. The method of claim 5, wherein the molar ratio of the sum of primary and secondary amino groups present in the polyamine (i) to epoxy groups present in the epoxy-functional silane (ii) ranges from 1:1 to 10:1.

10. The method of claim 1, wherein the inorganic filler comprises silica.

11. The method of claim 1, wherein the treatment composition further comprises a silane-functional monoamine selected from the group consisting of aminopropyltriethoxysilane, aminopropyltrimethoxysilane, aminobutyltriethoxysilane, aminobutyltrimethoxysilane, aminophenyltrimethoxysilane, 3-aminopropyltris (methoxyethoxyethoxy) silane, 11-aminoundecyltriethoxysilane, 2-(4-pyridylethyl) triethoxysilane, aminopropylsilanetriol, 3-(m-aminophenoxy)propyltrimethoxy silane, 3-aminopropylmethyldiethoxysilane, 3-amino propylmethyldiethoxysilane, 3-aminopropyldimethylethoxysilane, and mixtures thereof.

12. The method of claim 1, wherein the treatment composition further comprises a $C_1$ to $C_6$ alcohol.

13. The method of claim 12, wherein the alcohol is selected from methanol, ethanol, 1-propanol, isopropanol, 1-butanol, 2-butanol, 1-hexanol, and mixtures thereof.

14. A treated microporous membrane prepared by the method of claim 1.

15. A treated microporous membrane prepared by the method of claim 1, wherein the treated membrane is a component of a separation device.

16. A treated microporous membrane prepared by the method of claim 1, wherein the treated membrane is in the form of a sheet.

17. A method for treating a surface of a microporous membrane, the membrane comprising
a polyolefinic polymeric matrix, wherein the polyolefinic polymeric matrix comprises a polyolefin selected from the group consisting of ultrahigh molecular weight polyethylene, ultrahigh molecular weight polypropylene, high density polyethylene, high density polypropylene, and mixtures thereof;
finely divided particulate, substantially water-insoluble inorganic filler distributed throughout the polyolefinic polymeric matrix, wherein the inorganic filler is selected from the group consisting of silica, alumina, calcium oxide, zinc oxide, magnesium oxide, titanium oxide, zirconium oxide, and mixtures thereof; and a
network of interconnecting pores communicating throughout the microporous membrane,
wherein the membrane is prepared by:
mixing the polyolefin and the finely divided particulate, substantially water-insoluble inorganic filler and introducing the mixture to the heated barrel of a screw extruder,
extruding the heated mixture through a die to form a continuous sheet,
calendaring the continuous sheet, and
optionally, stretching the continuous sheet, the method comprising in sequence:
(1) contacting at least one surface of the membrane with a treatment composition comprising a silane-functional polyamine compound having at least one alkoxy silane group, wherein the treatment composition comprises (i) an acidic aqueous composition, or (ii) a basic aqueous composition, such that the silane-functional polyamine compound is in intimate contact with the filler present in the polyolefinic polymeric matrix; and
(2) effecting a condensation reaction between the inorganic filler which is distributed throughout the polyolefinic polymeric matrix and the silane-functional polyamine compound (i) by subjecting the membrane of (1) to ambient temperature for a time sufficient to effect the condensation reaction, and/or (ii) by subjecting the membrane of (1) to temperatures ranging from 50° C. to 145° C.

* * * * *